US008888867B2

(12) United States Patent
Bakkenes et al.

(10) Patent No.: US 8,888,867 B2
(45) Date of Patent: *Nov. 18, 2014

(54) SODIUM CHLORIDE PRODUCTION PROCESS

(75) Inventors: Hendrikus Wilhelmus Bakkenes, Apeldoorn (NL); Johannes Albertus Maria Meijer, Schalkhaar (NL); Allert Schokker, Deventer (NL); Maria Steensma, Arhnem (NL)

(73) Assignee: Akzo Nobel N.V., Arnhem (NL)

( * ) Notice: Subject to any disclaimer, the term of this patent is extended or adjusted under 35 U.S.C. 154(b) by 648 days.

This patent is subject to a terminal disclaimer.

(21) Appl. No.: 13/125,644

(22) PCT Filed: Oct. 29, 2009

(86) PCT No.: PCT/EP2009/064247
§ 371 (c)(1),
(2), (4) Date: Apr. 22, 2011

(87) PCT Pub. No.: WO2010/060718
PCT Pub. Date: Jun. 3, 2010

(65) Prior Publication Data
US 2011/0214257 A1    Sep. 8, 2011

Related U.S. Application Data

(60) Provisional application No. 61/111,140, filed on Nov. 4, 2008.

(30) Foreign Application Priority Data

Nov. 3, 2008  (EP) .................................. 08168209.8

(51) Int. Cl.
*C01D 1/30* (2006.01)
*C01D 3/06* (2006.01)
*C01D 3/14* (2006.01)

(52) U.S. Cl.
CPC ... *C01D 3/06* (2013.01); *C01D 3/14* (2013.01)
USPC .......................................... 23/303; 23/295 R

(58) Field of Classification Search
USPC ................................ 23/303, 295 R
See application file for complete search history.

(56) References Cited

U.S. PATENT DOCUMENTS

| | | | |
|---|---|---|---|
| 2,622,115 | A | 12/1952 | Carney |
| 3,058,729 | A | 10/1962 | Dahms et al. |
| 3,655,333 | A | 4/1972 | Stenger et al. |
| 3,779,030 | A | 12/1973 | Best |
| 4,654,064 | A | 3/1987 | Cheng et al. |
| 6,267,789 | B1 | 7/2001 | Ninane |
| 6,428,583 | B1 | 8/2002 | Reuter |
| 7,141,219 | B1 | 11/2006 | Klaren |
| 2007/0207082 | A1 | 9/2007 | Lee et al. |

FOREIGN PATENT DOCUMENTS

| | | |
|---|---|---|
| DE | 10 37 429 | 8/1958 |
| DE | 69 607 610 | 6/2001 |
| FR | 2 866 870 | 9/2005 |
| GB | 979 963 | 1/1965 |
| GB | 1 009 736 | 11/1965 |
| GB | 1 087 476 | 10/1967 |
| GB | 1 240 667 | 7/1971 |
| WO | WO 96/25360 | 8/1996 |
| WO | WO 01/28958 | 4/2001 |

OTHER PUBLICATIONS

International Search Report and Written Opinion, PCT/EP2009/064247, mailed Mar. 16, 2010.
Reply to Written Opinion of the International Searching Authority, PCT/EP2009/064247, dated Aug. 4, 2010.
International Preliminary Report on Patentability, PCT/EP2009/064247, mailed Jan. 17, 2011.
Habib, Boaz, et al., Chemical Engineering and Processing, "Heat Transfer and Operation Conditions for Freeze Concentration in a liquid Solid Fluidized Bed Heat Exchanger", vol. 45, 2006, pp. 698-710.
Stepakoff et al., Desalination, "Development of a Eutectic Freezing Process for Brine Disposal", vol. 14, 1974, pp. 25-38.
Avram et al., Technologies for Eutectic Freeze Crystallization, Ref. Chim., vol. 55 (10), 2004, pp. 769-772.
Kaufmann, Dale W., Sodium Chloride, "The Production and Properties of Salt and Brine", Hafner Publishing Company, New York, 1968, p. 547.
Ninane, L., et al., "Purification of Rocksalt by a New Process at Low Temperature", Salt 2000, 8$^{th}$ World Symposium, vol. 1, pp. 451-458.
Pronk, P., et al., Chemical Engineering and Processing, "Prevention of Crystallization Fouling During Eutectic Freeze Crystallization in Fluidized Bed Heat Exchangers", vol. 47 (2008) 2140-2149.
Swenne, D. A., et al., "The Eutectic Crystallization of Sodium Chloride Dihydrate and Ice", J. Separ. Proc. Technol., 1985, vol. 6, pp. 17-25.
Kaufmann, Dale W., "Low Temperature Properties and Uses of Salt and Brine", Chapter 23 from Sodium Chloride: The Production and Properties of Salt and Brine, American Chemical Society, Monograph Series, 1960 Edition, pp. 547-568.

(Continued)

Primary Examiner — Edward Johnson
(74) Attorney, Agent, or Firm — Kenyon & Kenyon LLP

(57) ABSTRACT

The present invention pertains to a process for producing sodium chloride comprising the steps of: (i) preparing a brine having a sodium chloride concentration which is higher than the sodium chloride concentration of the eutectic point but lower than the sodium chloride concentration of a saturated brine by dissolving a sodium chloride source in water; (ii) cooling the resulting brine by indirect cooling in a self-cleaning fluidized bed heat exchanger/crystallizer to a temperature lower than 0° C. but higher than the eutectic temperature of the resulting brine, thereby forming a slurry comprising sodium chloride dihydrate and a mother liquor; (iii) feeding the sodium chloride dihydrate to a recrystallizer to form sodium chloride and a mother liquor, and (iv) recycling at least part of the mother liquor obtained in step (ii) and/or step (iii) to step (i).

20 Claims, 1 Drawing Sheet

(56) References Cited

OTHER PUBLICATIONS

Seckler, M. M., et al., "Application of Eutectic Freeze Crystallization to Process Streams and Wastewater Purification", Eutectic Freeze Crystallization EETK97129 Project, pp. 1-14.

Swenne, D. A., "The Eutectic Crystallization of NaCl.2H$_2$0 and Ice", PhD Thesis, 1983, pp. 1-141.

Meewisse, J. W., "Fluidized Bed Ice Slurry Generator for Enhanced Secondary Cooling Systems", PhD Thesis, 2004, pp. 1-218.

Pronk, P., "Fluidized Bed Heat Exchangers to Prevent Fouling in Ice Slurry Systems and Industrial Crystallizers", PhD Thesis, 2006, pp. 1-262.

Vaessen, R., "Development of Scraped Eutectic Crystallizers", PhD Thesis, 2006, pp. 1-164.

McCarthy, C., et al., Abstract in Proceedings of the International Conference on the Physics and Chemistry of Ice, 11$^{th}$, Bremerhaven, Germany, Jul. 23-28, 2006 (2007), pp. 391-398, Abstract Only.

International Search Report for PCT/EP2009/056472, mailed Sep. 15, 2009.

Written Opinion of the International Searching Authority for PCT/EP2009/056472, mailed on Sep. 15, 2009.

Response to Written Opinion for PCT/EP2009/056472, dated Apr. 14, 2010.

International Preliminary Report on Patentability for PCT/EP2009/056472, mailed on Oct. 13, 2010.

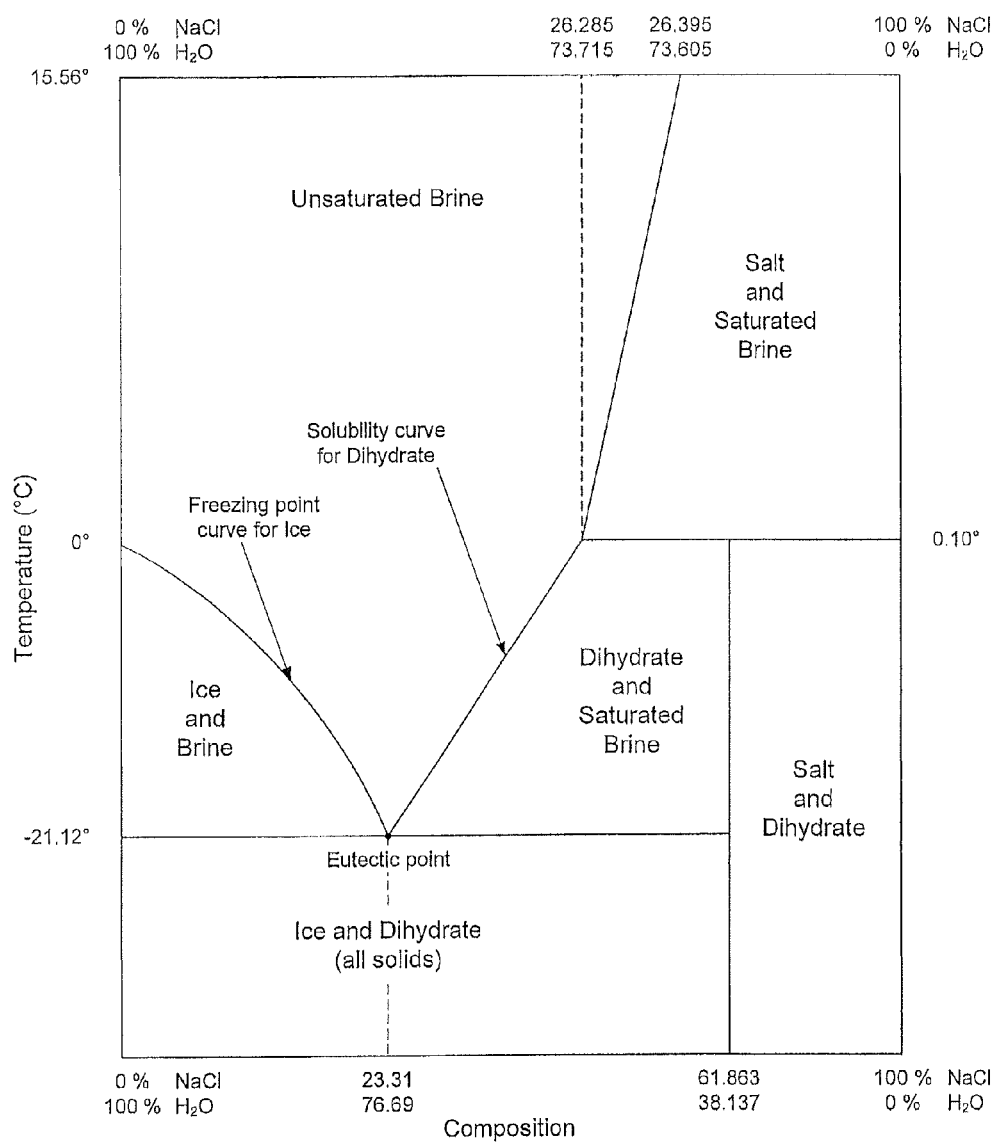
The system sodium chloride-water (Not to scale)

SODIUM CHLORIDE PRODUCTION PROCESS

REFERENCE TO RELATED APPLICATION(s)

This application is the U.S. National Phase of PCT/EP2009/064247 filed on Oct. 29, 2009, and claims the benefit of U.S. Provisional Application No. 61/111,140 filed on Nov. 4, 2008.

The present invention relates to a novel sodium chloride production process.

Sodium chloride is made industrially from aqueous solutions produced by dissolving a natural source of the sodium chloride in water and crystallizing it from the resulting aqueous sodium chloride solution by evaporation of water, which is generally accomplished using multiple-effect or vapour recompression evaporators. Multiple-effect systems typically contain three or more forced-circulation evaporating vessels connected in series. The steam produced in each evaporator is fed to the next one in the multiple-effect system to increase energy efficiency. Vapour recompression forced-circulation evaporators consist of a crystallizer, a compressor, and a vapour scrubber. The aqueous sodium chloride solution (brine) enters the crystallizer vessel, where salt is crystallized. Vapour is withdrawn, scrubbed, and compressed for reuse in the heater.

Both recompression evaporators and multiple-effect evaporators are energy-intensive because of the water evaporation step involved. Furthermore, brine produced by dissolving a natural sodium chloride source in water normally contains a quantity of major contaminations. Said contaminations in brine obtained from a natural source comprise, in al., potassium, bromide, magnesium, calcium, strontium, and sulfate ions. For many applications, such as in the chemical transformation industry (e.g. the chlorine and chlorate industry), where the equipment used is extremely sensitive, these contaminations have to be removed to a large extent.

The most common procedure for dealing with the problems mentioned above is to purify the raw brine before it is fed to the evaporation plant. Typically, however, brine purification does not remove or diminish the contamination of K and Br.

Furthermore, as a result of brine purification carbon dioxide, bicarbonate, and carbonate will be present in the purified brine. During evaporative crystallization in conventional evaporators (multiple-effect or vapour recompression units, usually operated at elevated temperature) $CaSO_4.xH_2O$, $SrCO_3$, and $CaCO_3$ scaling can be formed, especially at the surface of the heat exchangers. As a result of this scaling, the production capacity of the salt plant decreases with time, as does the energy efficiency of the process. After a production period that is typical for the quantity of contaminations in the aqueous solution and for the set-up of the conventional process, the evaporation unit needs to be cleaned, so the availability of the salt plant is also reduced.

As the current technology requires substantial amounts of energy and the energy prices have increased significantly over time, there is need for a sodium chloride production process where less energy is used.

Avram et al. in "Technologies for eutectic freeze crystallization", *Rev. Chim.*, Vol. 55 (10), 2004, pp. 769-772 disclose eutectic freeze crystallization as a technique to separate an aqueous solution into ice and a solidified solution. It is mentioned that eutectic freeze crystallization is mainly applicable in the treatment of waste water containing inorganic salts.

Habib and Farid in "Heat transfer and operating conditions for freeze concentration in a liquid-solid fluidized bed heat exchanger", *Chemical Engineering and Processing*, Vol. 45, 2006, pp. 698-710 disclose a freeze concentration process wherein liquids are concentrated by freezing out water. More particularly, they disclose subjecting an aqueous solution comprising 8 wt % of NaCl or less to a cooling step inside a single tube fluidized bed heat exchanger to form ice. Via this process a concentrate rich in its solutes is prepared.

U.S. Pat. No. 3,779,030 relates to a method of making a sodium chloride concentrate from seawater. In col. 1, lines 59-67, the principle of eutectic freezing is explained. However, ice crystals are produced to provide a supply of fresh water and seawater is only being concentrated via this method.

The salt solutions mentioned in these documents are suitable for the formation of ice, which would for example be valuable in areas with a shortage of potable water. However, these solutions are not suitable for the large-scale production of sodium chloride.

Stepakoff et al. in *Desalination*, Vol. 14, 1974, pp. 25-38 discloses a process involving continuously freezing brine in a stirred tank freezer by direct contact with an immiscible refrigerant until the eutectic temperature is reached. More particularly, the brine is cooled by direct cooling with Freon R-114 so that at −6° F. five phases coexist: viz. ice, brine, dihydrate, liquid Freon, and Freon vapour. It mentions that such a eutectic freezing process will make a major contribution to the problem of waste disposal, be it for industrial effluents or brackish waters. However, the feed streams used by Stepakoff et al. as well as the described method of eutectic freezing are not suitable for application in a large-scale production of sodium chloride.

GB 1,009,736 discloses a method for producing purified anhydrous sodium chloride salt from a supply of relatively impure anhydrous salt. According to this process, a saturated brine is circulated or passed through the supply salt, thus producing a slurry. The temperature of the salt and brine mixture is kept between 32.2° F. and −6.02° F. inclusive, in order to dissolve the salt feed and to form dihydrate therefrom. Subsequently, the brine-dihydrate slurry so formed is subjected to a heating operation in order to melt the dihydrate and to form an excess of purified anhydrous salt precipitating from the associated brine. The excess anhydrous salt is separated for product delivery, while the associated brine is returned to the salt feed supply for repetition of the process.

The process according to GB 1,009,736 can only be used for solid anhydrous salt supplies. It is not suitable for the production of anhydrous sodium chloride salt via solution mining. Another disadvantage of this process is that the circulating brine becomes overcontaminated with impurities abstracted from the feed supply salt, so that the brine has to be either discarded and replaced or treated chemically so as to maintain it in usable form.

The objective of the present invention is to provide a sodium chloride production process which can be performed on an industrial scale, which is less energy-consuming than the conventional evaporation salt production processes, and which is suitable for the production of salt wherein the salt source is a subterranean salt deposit exploited by means of solution mining. Another objective of the present invention is to produce the desired sodium chloride purity without a brine purification step being needed. The desired sodium chloride purity is equal to or higher than the purity of salt of the same brine after conventional purification and conventional evaporative crystallization steps. Preferably, the purity is higher in the sense that the concentration of K and Br is lower in the resulting salt. Yet another objective of the present invention is to provide a sodium chloride production process wherein the purge of sludges can be kept to a minimum.

Surprisingly, it has been found that these objectives are realized by means of a process wherein use is made of a specific temperature lowering step. In more detail, the sodium chloride production process according to the present invention comprises the steps of:

(i) preparing a brine having a sodium chloride concentration which is higher than the sodium chloride concentration of the eutectic point but lower than the sodium chloride concentration of a saturated brine by dissolving a sodium chloride source in water;

(ii) cooling the resulting brine by indirect cooling in a self-cleaning fluidized bed heat exchanger/crystallizer to a temperature lower than 0° C. but higher than the eutectic temperature of the resulting brine, thereby forming a slurry comprising sodium chloride dihydrate and a mother liquor;

(iii) feeding the sodium chloride dihydrate to a recrystallizer to form sodium chloride and a mother liquor, and (iv) recycling at least part of the mother liquor obtained in step (ii) and/or step (iii) to step (i).

The process according to the present invention is less energy-consuming than the conventional evaporation processes. The main reduction in energy consumption comes from the difference in heat of crystallization compared to heat of evaporation even when multiple use of steam is applied. Furthermore, with the present process it is no longer necessary to purify the raw brine prior to the crystallization step. More particularly, in conventional production methods where sodium chloride is produced from a brine via evaporation of water, slightly soluble solid waste products like $Mg(OH)_2$, $CaSO_4.xH_2O$, $SrCO_3$, and $CaCO_3$ have to be crystallized from the raw brine first and subsequently discarded. If this brine purification treatment were not performed, the sodium chloride produced in the crystallization step by evaporation of water would be severely contaminated with Mg, Ca, and Sr in some form. For this brine purification treatment significant amounts of brine purification chemicals are required.

Such a purification treatment is superfluous in the process according to this invention. After subjecting an unpurified raw brine to a crystallization step to produce sodium chloride dihydrate, followed by a recrystallization step, a similar or even higher sodium chloride purity is obtained as compared to the salt purity of sodium chloride that would be obtained from the same brine but using a conventional evaporation process including said brine purification step.

Furthermore, the concentration of K and Br in a brine is not affected by the above-mentioned brine purification treatment, but it is merely reduced by crystallization. The present process comprises two crystallization steps, compared to one crystallization step in the conventional processes.

Advantages of the new process are therefore that the produced sodium chloride contains lower K and Br levels and that the purge of sludges of $Mg(OH)_2$, $CaSO_4.xH_2O$, $SrCO_3$, and $CaCO_3$ is avoided. Furthermore, neither investment nor maintenance, nor costs of purifying chemicals, nor manpower for brine purification is required.

Another major advantage of the process according to the present invention is the fact that all impurities present in raw brine can be restored in the caverns in which the brine is produced in the first place, which also makes this process more environment-friendly than conventional salt production processes.

Yet another advantage of the present process is that since the process is a low-temperature process, less corrosion is to be expected and cheaper construction materials can be applied.

BRIEF DESCRIPTION OF THE DRAWINGS

The figure shows the temperature versus composition graph for the sodium chloride-water system.

In the context of the present application, it is noted that the "eutectic temperature" is the temperature at which crystallization of a eutectic mixture takes place. Moreover, the term "eutectic mixture" is used in its normal connotation, meaning that it defines a mixture of certain components in such proportions that the melting point is as low as possible and that, furthermore, these components will crystallize from solution simultaneously at this temperature. The temperature at which crystallization of a eutectic mixture takes place is called the "eutectic temperature", and the composition and temperature at which this takes place is called the "eutectic point" (see e.g. FIG. 1). A pure aqueous sodium chloride solution has a eutectic point at −21.12° C. and 23.31% sodium chloride by weight (Dale W. Kaufmann, *Sodium Chloride, The Production and Properties of Salt and Brine*, Hafner Publishing Company, New York, 1968, p. 547). In this respect reference is also made to FIG. 1. It is noted that impurities in brine will influence the temperature and/or the composition at which crystallization of a eutectic mixture takes place (also sometimes denoted as the eutectic point).

Starting from a pure aqueous sodium chloride solution at 20° C., three composition areas can be distinguished:
1. 0-23.31 wt % of sodium chloride
2. 23.31-26.29 wt % of sodium chloride
3. ≥26.29 wt % of sodium chloride—a saturated sodium chloride solution, with all weights being based on total brine.

Cooling 0-23.31 wt % of unsaturated brine yields ice at some temperature between 0° C. and −21.12° C. As pure water in the form of ice is removed from the system, the remaining brine will become more concentrated. Further cooling will yield more ice and brine that is more concentrated still. Finally, at −21.12° C., the eutectic point is reached; besides ice, sodium chloride dihydrate is formed and, eventually, the entire brine becomes solid if sufficient heat is withdrawn.

Cooling 23.31-26.29 wt % of unsaturated brine yields dihydrate at some temperature between 0.10° C. and −21.12° C. As pure dihydrate (which contains more (~62 wt %) NaCl than the brine) is formed in the system, the remaining brine will become less concentrated. Further cooling will yield more dihydrate and, consequently, the brine becomes even less concentrated. Finally, at −21.12° C., the eutectic point is reached where in addition to sodium chloride dihydrate also ice is formed and, eventually, the entire brine becomes solid if sufficient heat is withdrawn.

Cooling brine containing more than 26.29 wt % of sodium chloride firstly yields some anhydrous NaCl (the normal salt) and a slightly less concentrated brine till 0.10° C. is reached. At this temperature the anhydrate (NaCl) just crystallized will convert to dihydrate. Subsequently, the process as described above for cooling a 23.31-26.29 wt % aqueous sodium chloride solution will take place.

It is emphasized once more that the above temperatures and composition areas are for pure NaCl brine. If impurities are present in the brine, these temperatures and composition areas may be slightly different.

In accordance with the present invention, in the temperature lowering step (ii) the brine is preferably cooled to a temperature just above its eutectic temperature. The term "just above its eutectic temperature" denotes a temperature higher than the eutectic temperature. In practice, the term "just above its eutectic temperature" denotes a temperature "0.01° C. or more above its eutectic temperature". By cooling to just above the eutectic temperature the undesired formation of ice is avoided. Depending on process restraints, it may be desirable to cool not too close to the eutectic point but to stop cooling at any temperature between the onset of anhydrate and/or dihydrate formation and the eutectic temperature. More particularly, the brine in the temperature lowering step (ii) is more preferably cooled to a temperature of 0.1° C., even more preferably 0.5° C., and most preferably 1° C. above its eutectic temperature.

In cooling step (ii), the brine is suitably cooled to a temperature below the onset of anhydrate and/or dihydrate crystallization. In practice, this means that the brine is in any case cooled to a temperature lower than 0.1° C. (absolute). Preferably, it is cooled to a temperature of 14° C. above its eutectic temperature or colder. More preferably, in order to increase the yield, the brine is cooled to a temperature of 11° C. above its eutectic temperature or colder. Most preferably, it is cooled to a temperature of 7° C. above its eutectic temperature or colder.

In this respect it is observed that the energy input in the cooling step (ii) of the present invention is only used for cooling the brine stream and forming the dihydrate crystals, which energy input is therefore relatively low.

Moreover, it was found that the energy involved in recycling the mother liquor to a subterranean salt deposit may be limited or substantial, depending on the distance to the salt deposit. This means that overall there is a substantial window in which the present process (including the brine recycle) has a much lower energy consumption than the conventional evaporation salt production processes (including brine supply), per ton of salt produced.

In addition, it is observed that no separation step is needed to separate ice from sodium chloride dihydrate, which is the case in eutectic freeze crystallization processes.

Moreover, in accordance with the present invention the entire formation and thus potential scaling of ice on the inner walls of the vessel to be used in the salt production process is attractively prevented, enabling the process to be carried out in a continuous mode of operation without need of ice scaling prevention. It was found that the temperature difference between the temperature (in the bulk) of the brine which is subjected to the crystallization step and the temperature of a cooling medium which is present on the other side of the reactor walls can be substantially higher than in the case of eutectic freezing. In the case of eutectic freezing the maximum temperature difference is typically as low as 1.0-1.5° C. in order to minimize the risk of freezing up of the reactor. With the present process, the maximum temperature difference is typically 2-3 times more, resulting in a more efficient process.

The process will now be explained in more detail. In the first step (i), a brine is prepared by dissolving a sodium chloride source in water. It is noted that the term "sodium chloride source" as used throughout this document is meant to denominate all salt sources of which more than 50 wt % is NaCl. Preferably, such salt contains more than 75 wt % by weight of NaCl. More preferably, the salt contains more than 85 wt % by weight of NaCl, while a salt containing more than 90% by weight NaCl is most preferred. The salt may be solar salt (salt obtained by evaporating water from brine using solar heat), rock salt, or a subterraneous salt deposit. Preferably, the salt source is a subterraneous salt deposit exploited by means of solution mining (hereinafter also denoted as a brine production cavern).

For the water in the present process, any water supply normally used in conventional salt crystallization processes can be employed, for instance water from surface water sources, groundwater, or potable water.

The brine prepared in the first step of the process of the present invention has a sodium chloride concentration which is higher than the sodium chloride concentration of the eutectic point. However, the brine in step (i) has a sodium chloride concentration which is less than the sodium concentration of a saturated sodium chloride solution (hereinafter also denoted as an almost saturated sodium chloride solution.

Typically, the sodium chloride concentration of the brine prepared in the first step of the present process has a sodium chloride concentration which is at least 0.01% by weight of sodium chloride (based on the total weight of said brine) higher than the eutectic concentration (i.e. of the concentration of sodium chloride in said brine at the eutectic point). Preferably, said brine has a concentration which is at least 0.1% by weight, more preferably at least 1% by weight and even more preferably at least 2% by weight, more concentrated in sodium chloride than the eutectic concentration.

In a preferred embodiment according to the invention, the brine prepared in the first step of the process of the present invention is an almost saturated sodium chloride solution. An almost saturated sodium chloride solution is meant to denote a sodium chloride solution having a sodium chloride concentration which is low enough to avoid undesired incrustations of sodium chloride on the equipment with which said solution is in contact but which is close to saturation. As the skilled person will understand, it is not possible to define "an almost saturated sodium chloride solution" by mentioning one specific sodium chloride concentration, since the amount of sodium chloride that will be dissolved in a saturated sodium chloride solution is dependent on the amount of impurities present in said brine. Typically, however, an almost saturated sodium chloride solution is a solution which can be prepared from the corresponding saturated sodium chloride solution by adding just enough water so that undesired incrustations on the equipment during the process are avoided, which usually is at least 0.5 wt % of water, and preferably is between 0.5 and 1.5 wt % of water based on the total weight of the saturated sodium chloride solution. In other words, the brine prepared in the first step of the process of the present invention preferably is a brine which comprises at most 99.5 wt %, more preferably at most 99.0 wt % and, most preferably, at most 98.5 wt % of the sodium chloride dissolved in said brine when being saturated for sodium chloride. The brine which is subjected to cooling step (ii) is not a slurry, but a clear brine, i.e. a brine which does not comprise any solid sodium chloride when judged by the human eye.

Cooling brine in step (ii) of the process according to the present invention is effectuated by indirect cooling. By "indirect cooling" is meant that use is made of cooling means where a cooling medium is not in direct contact with the brine. More specifically, the cooling medium is contained in a closed circuit and the brine to be cooled is physically totally separated from the cooling medium by a solid (e.g. tube) wall. Indirect cooling is used, because in that case contamination of the produced sodium chloride with traces of the cooling medium is completely prevented, and additional purification steps can attractively be avoided. The cooling medium can be one or more refrigerants, such as ammonia, butane, carbon dioxide or Freon, or a liquid or mixture of liquids that do not exhibit a phase change at heat exchanging, such as an ethylene glycol/water mixture, a calcium chloride/water mixture, a potassium formate/water mixture, alkyl substituted aromatics (e.g. Dowtherm J ex Dow Chemical Company), or polydimethylsiloxane. Indirect cooling of the brine is preferably achieved either via an evaporating falling film or via a closed circuit with a cooling medium (i.e. a liquid without phase change at heat exchanging). If indirect cooling is achieved with a liquid without phase change at heat exchanging, said cooling medium is cooled using a refrigerant, it subsequently releases its cold to the brine via a solid wall, and it is recycled to be cooled again using said refrigerant.

According to the present invention, indirect cooling is preferably achieved by means of a closed circuit wherein the brine is physically totally separated from a cooling medium selected from the group consisting of ammonia, butane, carbon dioxide, Freon, ethylene glycol/water mixture, a calcium chloride/water mixture, a potassium formate/water mixture, alkyl substituted aromatics, and polydimethylsiloxane by a solid wall. In another preferred embodiment according to the present invention, indirect cooling is achieved via an evaporating falling film of a cooling medium selected from the group consisting of ammonia, butane, carbon dioxide, and Freon.

The indirect cooling step (ii) of the process according to the present invention is carried out in a self-cleaning fluidized bed heat exchanger/crystallizer to keep the walls sufficiently free of deposits. By the term "self-cleaning fluidized bed heat exchanger/crystallizer" is meant a vertical shell-and-tube heat exchanger equipped with additional means to keep the walls free of deposits. For instance, in the tubes of the heat exchanger a fluidized bed of steel particles (in the process stream) is maintained. Such a heat exchanger has, for instance, been described in U.S. Pat. No. 7,141,219. A clear advantage of a fluidized bed heat exchanger/crystallizer is that it comprises considerably fewer mechanical parts than a scraped cooled wall crystallizer, thus making it less expensive than a scraped cooled wall crystallizer. Especially for large-scale production this represents a considerable saving in costs. Further, a fluidized bed heat exchanger/crystallizer has increased operational reliability compared to scraped cooled wall crystallizers. Also, the significantly higher heat transfer rates routinely obtained in a fluidized bed heat exchanger compared to conventional heat transfer equipment lead to a substantial size reduction of the heat transfer equipment at a given duty. Also, the start-up and control are comparatively easy.

The cooling step is preferably carried out at a pressure of at least 0.3 bar, preferably at least 0.5 bar, and most preferably at least 0.7 bar. Preferably, the pressure is not higher than 7 bar and more preferably not higher than 5 bar. Most preferably, the process is carried out at atmospheric pressure only increased with static pressure and dynamic pressure imposed by a circulation pump.

In one embodiment of the present invention, a first cooling step of the raw brine to about 0° C. is performed in a conventional way, prior to cooling step (ii). More particularly, such cooling to about 0° C. can suitably be performed in a fluidized bed heat exchanger/crystallizer, but it is more preferred to perform this step in a conventional heat exchanger such as a shell-and-tube heat exchanger or a plate heat exchanger. Subsequently, the cooled raw brine may be mixed with recycled crystal slurry or clear mother liquor to control the slurry density and/or the degree of concentration of the mother liquor. The cooled brine with optional crystals of sodium chloride anhydrate and/or dihydrate will subsequently be cooled further in a fluidized bed heat exchanger/crystallizer to a temperature approaching but not reaching the eutectic temperature as described above while crystallizing sodium chloride dihydrate. This cooling is achieved by indirect cooling. Heat exchange conditions are preferably chosen such that the slurry density generated by sodium chloride dihydrate does not disturb the correct functioning of the fluidized bed heat exchanger/crystallizer. Subsequently, the resulting slurry comprising sodium chloride dihydrate and a mother liquor will be subjected to a separation step wherein the formed sodium chloride dihydrate will be separated from the mother liquor.

Separating the mother liquor from the sodium chloride dihydrate preferably takes place using one or more cyclones, or one or more decanters, optionally combined with one or more centrifuges or filters.

Sodium chloride dihydrate separated from the mother liquor may be purified before it is subjected to the recrystallization step. It may be purified by any conventional means, but preferably it is purified using a wash column in which, preferably, mother liquor obtained from the recrystallization step is used countercurrently as wash liquid.

In a next step, optionally purified sodium chloride dihydrate is fed to a recrystallizer to form sodium chloride and mother liquor.

Preferably, the recrystallization conditions are chosen such that the standard particle size distribution of standard unsieved vacuum salt is produced (i.e. the crystals have such a particle size distribution that they will be retained on a sieve of about 100 μm but will pass a sieve of 1,000 μm). Limited agitation and small temperature differences with respect to the transition temperature of sodium chloride dihydrate to sodium chloride anhydrate (about 0.1° C.) will produce the desired particle size distribution. Preferably, recrystallization is executed in plug flow to ensure it is completely finished at the exit of the recrystallization section. Plug flow may also be mimicked by a number of recrystallizers in series, e.g. continuous mixed-suspension, mixed-product removal (CMSMPR) recrystallizers. The salt resulting from the recrystallization is separated from the mother liquor by any conventional means, preferably hydrocyclones and centrifuges, and optionally processed further. As mentioned, the mother liquor may subsequently be partly recycled as wash liquid to the wash column.

At least part of the mother liquor obtained in the cooling step (ii) is recycled to the first step, i.e. to the step where raw brine is prepared by dissolving a salt source in water. Suitably, the first step is therefore carried out in a brine production cavern. Alternatively, at least part of the mother liquor obtained in the recrystallization step (iii) of the sodium chloride dihydrate is recycled to the first step. It is also possible to recycle both mother liquors (in part or in total) to the first step. Total recycling of both the mother liquor from the cooling step (ii) and the mother liquor from the recrystallization step (iii) will return all impurities to their origin (i.e. the brine production cavern) without discharge to the environment. Hence, this embodiment of the present invention is most attractive from an environmental perspective. Of course, as a consequence the quality of the raw brine will be substantially worse than without such recycle. Surprisingly, however, it was found that the quality of said raw brine remains sufficient to produce high-quality salt, as the crystallization and recrystallization of sodium chloride dihydrate renders a salt with a higher purity than in the case of salt produced from the same brine using conventional purification and evaporative crystallizations steps.

The possibility to recycle mother liquid to the production cavern in the process according to the invention is in stark contrast with conventional evaporation processes where, for quality reasons, recycling of mother liquors to raw brine production caverns is avoided as much as possible to keep the impurity concentrations in raw brine as low as possible.

Contaminations in raw aqueous sodium chloride solutions prepared from a natural source almost always include sulphate ions. The presence of sulphate ions may have an adverse effect on the recrystallization step (i.e. step (iii) of the present process). Therefore, it is preferred that if more than 0.08 wt % of sulphate ions are present in the brine prepared by dissolving a sodium chloride source in water (i.e. step (i) of the present process), measures are taken to avoid sodium chloride with a too high sulphate concentration being produced. More particularly, when cooling a brine comprising sulphate ions, eventually solid $Na_2SO_4.10H_2O$, hereinafter also denoted as Glauber salt, will be formed. The solubility of Glauber salt diminishes rapidly with decreasing temperature. As a result, upon cooling the resulting brine by indirect cooling in a self-cleaning fluidized bed heat exchanger/crystallizer to a temperature lower than 0° C. but higher than the eutectic temperature of the resulting brine, Glauber salt will crystallize out of the solution, together with the sodium chloride dihydrate. Hence, if more than 0.08 wt % of sulphate ions are present in the brine prepared by dissolving a sodium chloride solution in water, in a preferred embodiment according to the present invention, the slurry obtained in step (ii) comprising, besides sodium chloride dihydrate and mother liquor, also Glauber salt, is subjected to a step wherein the sodium chloride dihydrate and the Glauber salt are physically separated from each other. Preferably, this separation is carried out using a hydrocyclone. In more detail, the slurry comprising sodium chloride dihydrate, Glauber salt and mother liquor obtained in step (ii) is fed to a hydrocyclone to obtain a sodium chloride dihydrate-rich stream and a Glauber salt-rich stream. The sodium chloride dihydrate-rich stream is subsequently subjected to the recrystallization step (i.e. step (iii) of the present process). The Glauber salt-rich stream is preferably at least in part recycled to step (i). By the term "sodium chloride dihydrate-rich stream" is meant a stream containing more than 50 wt % of all the sodium dihydrate present in the slurry obtained in step (ii) prior to its being subjected to said separation step. A Glauber salt-rich stream contains more than 50 wt % of all the Glauber salt present in the slurry prior to separation.

For this step any hydrocyclone conventionally used in salt production processes may be used.

The just-described additional process step is even more preferred if more than 0.82 wt % of sulphate ions are present in the brine prepared in step (i), and is most preferred if more than 1.2 wt % of sulphate ions are present in the brine prepared in step (i) of the present process.

The process according to the present invention is further illustrated by the following non-limiting examples.

Example 1

A portion of 1,200 g of a 26 wt % NaCl solution (prepared by dissolving pharma grade salt in demineralized water at ambient temperature) was placed in a jacketed glass vessel and cooled down using Syltherm 800 for cooling. Below 0° C. sodium chloride dihydrate started to crystallize. Cooling was stopped at −19° C. Only one solid phase had formed. When stirring was stopped, the crystals sank to the bottom of the vessel. The formed crystals were isolated by filtering off the mother liquor. The mother liquor was analyzed for NaCl content (by weight) and was found to contain 23.6 wt % NaCl.

The sodium chloride dihydrate crystals were placed in a bowl and the temperature was raised to 10° C. The crystals started to recrystallize into anhydrous sodium chloride. Part of the sodium chloride product dissolved in the liberated crystal water, so some saturated brine was formed. The crystals were separated from the brine by filtration over a glass filter and were of high purity.

Example 2

In a test vessel, 2,232 g of raw brine obtained from a commercially used brine production cavern (Hengelo, The Netherlands; brine containing 25.9 wt % NaCl and amongst other impurities 1250 mg/kg of $Ca^{2+}$) was cooled down overnight to −18° C. in a freezer. A solid phase was formed, located on the bottom of the test vessel. This phase comprises sodium chloride dihydrate (NaCl.2aq). The formed crystals were removed by filtration at −18° C. The mother liquor was analyzed for NaCl content and contained 23.7 wt % NaCl, showing that the NaCl concentration of the mother liquor was still above the eutectic concentration, as expected. Part of the crystals were washed with ice water and redissolved in 1.5 times their mass of clean water. The resulting calcium concentration in the sodium chloride dihydrate crystals was determined via Inductively Coupled Plasma (ICP) and was 40 mg/kg.

Example 3

A portion of the sodium chloride dihydrate crystals obtained in Example 2 are washed with ice water to remove adhering mother liquor. Subsequently, they are reheated to +10° C. to effect recrystallization. More specifically, the sodium chloride dihydrate crystals recrystallize under these conditions into anhydrous NaCl (the 'normal' salt) suspended in saturated brine. The resulting solid NaCl contains 1.3 mg/kg of Ca (detected via Inductively Coupled Plasma (ICP)).

Calcium is one of the main impurities that needs to be removed in chemical brine purification operations in conventional vacuum salt making. Conventional high-purity vacuum salt contains 1-10 mg/kg Ca in the finished product, often above 3 mg/kg. This Ca level is the result of chemical brine purification and the crystallization step.

It was just shown that the sodium chloride obtained in the process according to the present invention has a Ca concentration of 1.3 mg/kg. Therefore, the quality of the salt obtained in the process according to the present invention is at least equivalent to the quality of the conventional product, and in many cases even purer than the conventional product. This purity is obtained without any chemical brine purification, by employing the two crystallization steps as disclosed.

The invention claimed is:

1. A process for producing sodium chloride comprising the steps of:
   (i) preparing, in a brine production cavern, a brine having a sodium chloride concentration which is higher than the sodium chloride concentration of the eutectic point but lower than the sodium chloride concentration of a saturated brine by dissolving a sodium chloride source in water;
   (ii) cooling the resulting brine by indirect cooling in a self-cleaning fluidized bed heat exchanger/crystallizer to a temperature lower than 0° C. but higher than the eutectic temperature of the resulting brine, thereby forming a slurry comprising sodium chloride dihydrate and a first mother liquor;

(iii) feeding the sodium chloride dihydrate to a recrystallizer to form sodium chloride and a second mother liquor, and (iv) recycling at least part of the first mother liquor and/or the second mother liquor to step (i).

2. The process according to claim 1 wherein the brine prepared in step (i) has a sodium chloride concentration which is at least 0.01% by weight more concentrated in sodium chloride than the eutectic concentration.

3. The process according to claim 1, wherein the brine prepared in step (i) has a sodium chloride concentration corresponding to the sodium chloride concentration obtained by dilution of said brine when being saturated in sodium chloride with at least 0.5% by weight of water, based on the total weight of the brine.

4. The process according to claim 1, wherein in step (ii) the resulting brine is cooled to a temperature in the range of from 0.1° C. above the eutectic temperature of the resulting brine to 14° C. above the eutectic temperature of the resulting brine.

5. The process according to claim 1, wherein in step (ii) the resulting brine is cooled to a temperature in the range of from 1° C. above the eutectic temperature of the resulting brine to 7° C. above the eutectic temperature of the resulting brine.

6. The process according to claim 1, wherein the indirect cooling is achieved by means of a closed circuit, wherein the resulting brine is physically totally separated from a cooling medium selected from the group consisting of ammonia, butane, carbon dioxide, Freon, ethylene glycol/water mixture, a calcium chloride/water mixture, a potassium formate/water mixture, alkyl substituted aromatics, and polydimethyl-siloxane by a solid wall.

7. The process according to claim 1, wherein the indirect cooling is achieved via an evaporating falling film of a cooling medium selected from the group consisting of ammonia, butane, carbon dioxide and Freon.

8. The process according to claim 1, wherein the slurry formed in step (ii) further comprises Glauber salt, and said slurry is fed to a hydrocyclone to produce a sodium chloride dihydrate-rich stream and a Glauber salt-rich stream, with said sodium chloride dihydrate-rich stream being subjected to step (iii).

9. The process according to claim 8, wherein the Glauber salt-rich stream is at least in part recycled to step (i).

10. The process according to claim 1 wherein the brine prepared in step (i) has a sodium chloride concentration which is at least 1% by weight more concentrated in sodium chloride than the eutectic concentration.

11. The process according to claim 2, wherein the brine prepared in step (i) has a sodium chloride concentration corresponding to the sodium chloride concentration obtained by dilution of said brine when being saturated in sodium chloride with at least 0.5% by weight of water, based on the total weight of the brine.

12. The process according to claim 2, wherein in step (ii) the resulting brine is cooled to a temperature in the range of from 0.1° C. above the eutectic temperature of the resulting brine to 14° C. above the eutectic temperature of the resulting brine.

13. The process according to claim 2, wherein in step (ii) the resulting brine is cooled to a temperature in the range of from 1° C. above the eutectic temperature of the resulting brine to 7° C. above the eutectic temperature of the resulting brine.

14. The process according to claim 3, wherein in step (ii) the resulting brine is cooled to a temperature in the range of from 1° C. above the eutectic temperature of the resulting brine to 7° C. above the eutectic temperature of the resulting brine.

15. The process according to claim 3, wherein the indirect cooling is achieved by means of a closed circuit, wherein the resulting brine is physically totally separated from a cooling medium selected from the group consisting of ammonia, butane, carbon dioxide, Freon, ethylene glycol/water mixture, a calcium chloride/water mixture, a potassium formate/water mixture, alkyl substituted aromatics, and polydimethyl-siloxane by a solid wall.

16. The process according to claim 5, wherein the indirect cooling is achieved by means of a closed circuit, wherein the resulting brine is physically totally separated from a cooling medium selected from the group consisting of ammonia, butane, carbon dioxide, Freon, ethylene glycol/water mixture, a calcium chloride/water mixture, a potassium formate/water mixture, alkyl substituted aromatics, and polydimethyl-siloxane by a solid wall.

17. The process according to claim 2, wherein the indirect cooling is achieved via an evaporating falling film of a cooling medium selected from the group consisting of ammonia, butane, carbon dioxide and Freon.

18. The process according to claim 4, wherein the indirect cooling is achieved via an evaporating falling film of a cooling medium selected from the group consisting of ammonia, butane, carbon dioxide and Freon.

19. The process according to claim 5, wherein the slurry formed in step (ii) further comprises Glauber salt, and said slurry is fed to a hydrocyclone to produce a sodium chloride dihydrate-rich stream and a Glauber salt-rich stream, with said sodium chloride dihydrate-rich stream being subjected to step (iii).

20. The process according to claim 7, wherein the slurry formed in step (ii) further comprises Glauber salt, and said slurry is fed to a hydrocyclone to produce a sodium chloride dihydrate-rich stream and a Glauber salt-rich stream, with said sodium chloride dihydrate-rich stream being subjected to step (iii).

* * * * *